July 2, 1963
H. W. YATES
CAMERA SHUTTER
3,095,795
Filed June 8, 1960
2 Sheets-Sheet 1
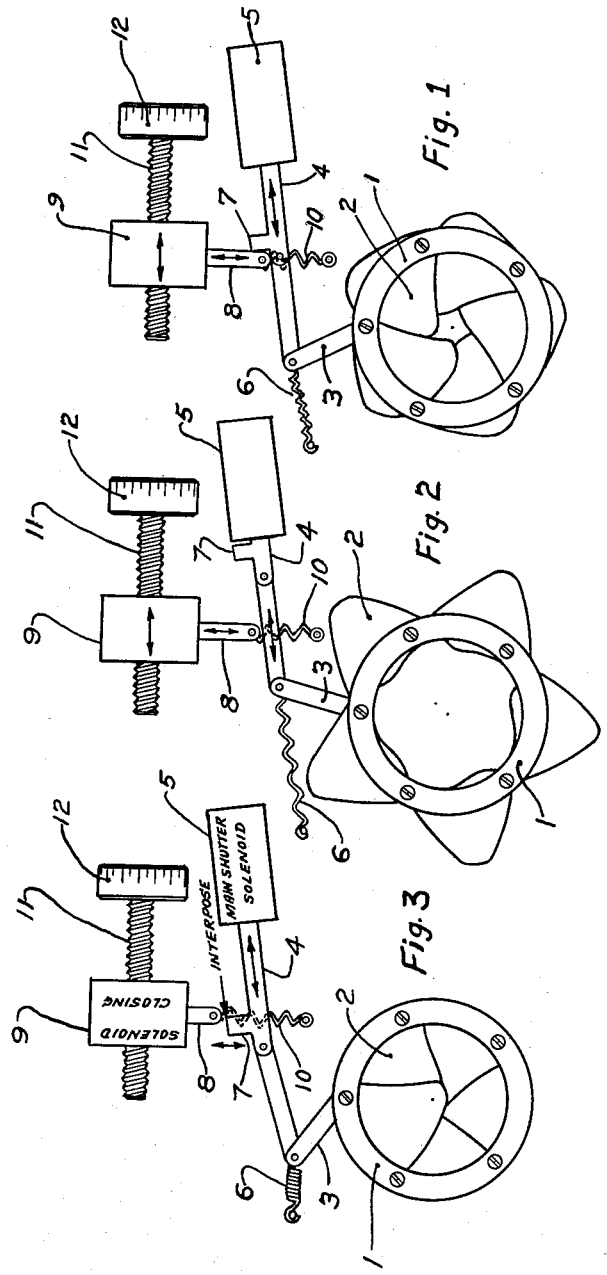
INVENTOR.
HAROLD YATES
BY Robert Ames Norton
ATTORNEY

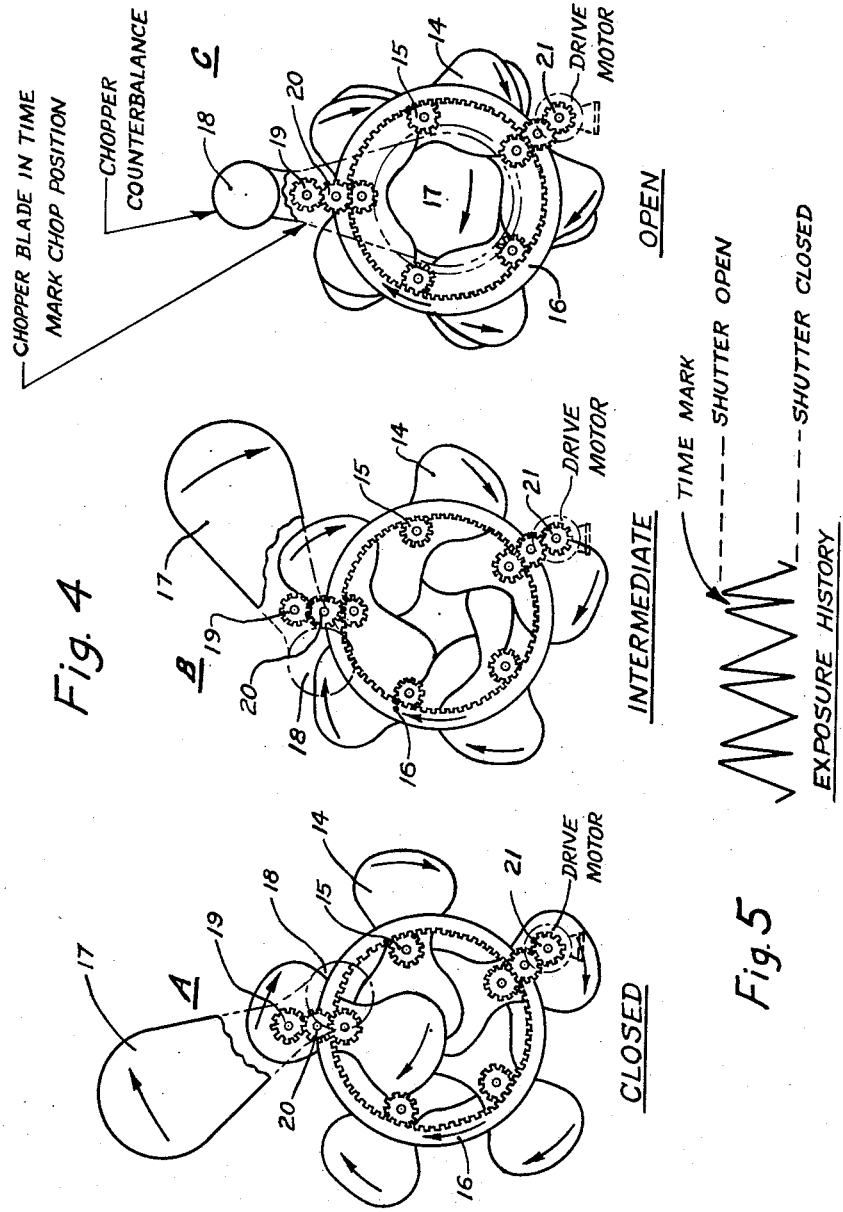

United States Patent Office 3,095,795
Patented July 2, 1963

3,095,795
CAMERA SHUTTER
Harold W. Yates, Stamford, Conn., assignor to Barnes Engineering Company, Stamford, Conn., a corporation of Delaware
Filed June 8, 1960, Ser. No. 34,721
5 Claims. (Cl. 95—53)

This invention relates to an improved shutter actuating mechanism for ballistic or streak cameras.

Ballistic cameras have been used extensively for the recording of rapidly-moving, glowing objects such as rockets, rocket nose cones re-entering the atmosphere, and the like. Essentially, a ballistic camera is simply an ordinary camera with a wide angle lens which can be pointed at a part of the sky across which it is expected the flaming object will move. When the object first comes into sight, the camera shutter is opened and remains open until the object has passed out of its field of view at which time the shutter is closed. As a result a track in the form of a streak registers on the negative, which is the reason for the alternate name of this type of camera.

A very serious problem arises when the object changes rapidly in apparent brilliance during its passage across the field of view of the camera. The most extreme case involves the re-entry of missiles or portions of missiles into the earth's atmosphere. At first the object glows rather dimly but its temperature rises very rapidly until a peak of brilliance is reached and then the temperature drops because the object has been slowed up. The effect is aggravated by the fact that when the object first enters the field of view, it may be a long way off and may be much closer when reaching or nearing the point of maximum brilliance. Since the object is very small, as compared with the distant field of view of the camera, the response of the film is determined more by the total radiation which the camera receives than by the intrinsic brilliance of the object. This is quite different from the ordinary situation of photographing scenes which occupy a fairly large portion of the field of view. In such cases the response of the film is largely, and usually wholly, determined by the brilliance of the object because a more distant object, while sending a smaller amount of radiation to the camera per unit area, is also recorded as a smaller image on the film. Both of these effects are proportional to the square of the distance, the first inversely and the second directly, and thus they cancel out.

Where, however, the object is so far away that its image on the film is a small point the second factor does not enter in and so the film exposure decreases with the square of the distance of the object. This latter effect is noticed just as much with an object of constant brilliance; for example, a rocket which is being launched or a distant jet airplane, and therefore the same problem is presented through the range of film exposure is less wide than in the case of an object of varying brightness, as a nose cone re-entering the atmosphere.

Because of the different film exposures resulting from the object at different points in its path across the field of view of the camera, it was impossible to provide correct exposure in the past except for a very short part of the path of the object.

Another problem is presented by the desirability of correlating the path recorded on the film with time and, for some purposes, an accurate knowledge of the instant of time corresponding to a particular part of the path is necessary.

In the past ballistic cameras which were operated with a single shutter opening have given fair tracks, at least over a portion of the field of view. However, it is often desired to obtain a spectral response from the object. This is conventionally done by introducing a diffraction grating into the camera so that the spectrum appears on a portion of the film on which the track or streak is not recorded. This has been possible only over a very small part of the track where the exposure of the dispersed spectrum falls within the useful response range of the film.

The above problems are solved more or less completely by means of the present invention, which is available in several modifications. In one, timing is provided with a greatly extended range of useful exposures. In another modification, periodic accurate exposures are obtained throughout the whole of the path. It is an advantage of the present invention that it is quite versatile and that its advantages may be used for a number of different problems.

The operation of the invention and its solution of the problems will be described in conjunction with the drawings in which:

FIG. 1 is a semi-diagrammatic elevation of a shutter at intermediate aperture;

FIG. 2 illustrates the same shutter at full opening;

FIG. 3 illustrates the shutter closed;

FIGS. 4A–4C show a modification in three successive views for producing correct exposure at intervals throughout the path on the film, and FIG. 5 is an exposure diagram of the device of FIG. 4.

FIGS. 1 to 3 show the basic form of shutter combination of the present invention in three different openings. In all of the figures the same parts bear the same reference numerals. The shutter, which is shown semidiagrammatically, is provided with a frame 1, the usual shutter leaves 2, an actuating lever 3 which is moved by a rod 4. This rod is driven by a solenoid 5 in a manner which will be described below. The conventional spring 6 pulls the actuating lever 3 towards the closed shutter position. The rod 4 is provided with a stop 7 which engages a movable armature 8 actuated by a solenoid 9 against the pull of a spring 10. The position of the solenoid 9 and hence the point at which the armature 8 engages the stop 7 is adjusted by the screw 11 which is provided with a calibrated dial 12.

In operation FIG. 1 shows the stop 7 engaged by the armature 8 at a position which opens the shutter partially. This opening is preset by means of the dial 12 to a point which will give proper exposure for the moving object at a point of maximum interest.

Effectively the present invention permits doubling the usual exposure range of any photographic emulsion used or other recording surface. The choice as to whether the two ranges should be continuous or whether one or other extreme should be favored depends on the nature of the object photographed at the point of maximum interest, as well as the characteristics of the emulsion. For example, in the case of a nose cone re-entry if the greatest interest is at the point of maximum brilliance, the adjustments of the dial 12 will be to a sufficiently small aperture so that usable results are obtained at the maximum brightness. The fact that the great advantage of doubling the dynamic range of the photographic emulsion used may be chosen practically at will adds to the versatility and flexibility of the invention.

Periodically the solenoid 5 is actuated to open the shutter wide. This position is shown in FIG. 2. The actuation of the shutter can be in any desired time sequence. A very satisfactory sequence for nose cone re-entry is one second wide open and one second partially closed. For other observations a different period can be used, and the invention lends itself to any time cycle because the solenoids respond almost instantly to time impulses or signals and the widest variation of periodic pattern is possible.

In the case of the nose cone re-entry which is being described the actuation of the solenoid 5 is synchronized to time, and timing marks may be placed on the film by any suitable means in synchronism with the timing signals actuating the solenoid. Marking a film with time indicia is not new. A number of methods have been proposed such as the flashing of a neon light along the edge of the film or other means which will give marks on the photographic emulsion. As the particular method of forming time marks on the film constitutes no part of the present invention, it is not shown and has been described above solely for the purpose of pointing out that the operation of the shutter may, and normally will, be synchronized with such conventional time marking.

After the object has passed the field of view of the camera, the solenoid 5 is cut off and a pulse actuates the solenoid 9. This temporarily withdraws the armature 8 and permits the stop 7 to slide past it to the closed shutter position which is shown in FIG. 3. The closing impulse may be initiated automatically or manually as desired.

When the simple modification of the present invention is used to produce a streak from a re-entering nose cone, at the beginning when the cone is radiating very little energy, the film will be completely underexposed at the predetermined shutter opening shown in FIG. 1, but every second the wide open shutter will give sufficient exposure so that even in the beginning phase of the re-entry there will be some record part of the time, with the time cycle described above every other second. As the nose cone increases in brilliance and/or comes nearer there will begin to be a record during the periods when the shutter is in the partially opened position shown in FIG. 1, and in the position in FIG. 2 the exposure will become more and more perfect. As the brilliance of the cone increases towards its maximum, the shutter opening on FIG. 1 begins to represent a more and more perfect exposure and the position of FIG. 2 represents a greater and greater degree of overexposure. If the field of view of the camera is such that the nose cone remains in it after it has been markedly slowed down, the decrease in brilliance and/or increase in distance will repeat the situation described for the start of the exposure but in reverse order. After the nose cone has passed out of the field of view of the camera, a pulse is applied to the solenoid 9 and the shutter closes.

It will be seen that by means of the present invention there will be a record of the path of the nose cone through an enormously greater range than is possible with a single shutter opening and exact timing can be noted because the different shutter openings will result in a different exposure for the portion of the track covered by them. Thus, at the start there will be a series of brighter and brighter dashes corresponding to the wide open shutter. Presently there will be both bright and less bright portions, the latter corresponding to the shutter position of FIG. 1. Then, for a very short period in the path, after maximum brilliance has been reached, the track will again pass through the same phases in reverse order. The different exposures can be sharply correlated with timing marks of the film where these are made and so the location and energy distribution at a wide number of points in the track is satisfactorily recorded photographically.

For timing purposes the simple setup described above will give an adequate record. However, where it is desired to obtain spectra at the various points by incorporating a conventional dispersing means such as the grating in the camera so that spectra are photographed on a different part of the film from the main track, there may not be a perfect exposure throughout the whole of the track. If it is desired to have the best spectral record throughout the whole track, a further modification of the present invention permits this. This further modification is shown in diagrammatic form in FIG. 4. It consists of an additional series of overlapping blades 14 mounted on shafts carrying small pinions 15 which revolve around a large gear 16. These blades constitute an auxiliary or additional shutter or diaphragm in series with the main shutter and are shown separately in FIG. 4. If the blades are actuated to give one or more revolutions throughout any one-second actuation of the main shutter, there will be a continuously varying exposure with each main shutter position from all the way closed, shown at the left of FIG. 4, through partly open, at the center, to wide open, at the right.

When the nose cone is first making its re-entry and so has very low brilliance, there will not be sufficient energy in the second when the main shutter is partially open, but during the second when it is wide open there will be one or more cycles of exposure from zero to wide open. In the beginning at the wide open point, there will often be sufficient energy to produce a narrow strip of usable spectrum one or more times a second in the wide open main shutter position. As the brilliance increases there will be exposure times that are right in each second and this will remain true with maximum brilliance because even at maximum brilliance the moving auxiliary shutter blades 14 reduce the opening periodically to a very small figure. As the nose cone dies down in brilliance there will only be useful spectral exposures during the wide open intervals of the main shutter as is the case when the re-entry is starting.

With only the continuously moving blades 14 there would be no accurate time marks and so an additional larger blade 17 is provided with a counterbalance 18 and pinion 19 driven from the main gear through the idler pinion 20. This blade periodically closes the shutter and it effects a much more rapid closing and opening than do the blades 14. As a result, periodic time marks are made near the open point of the secondary shutter. The time marks and the relative exposure are shown in graphic form in FIG. 5. The time marks are quite sharp and by synchronizing with the marking on the film a very accurate determination of time is possible. On the other hand, FIG. 5 shows that the rise and fall of exopsure effected by the blades 14 is more gradual so that at all times during the track there will be correct exposure for a short time and, as has been pointed out above, this permits obtaining useful spectrograms throughout the passage of the object across the field of view of the camera.

The modification of FIGS. 4 and 5 involves additional moving parts although the moving parts do not require precision manufacture and the gears may be made quite cheaply as there is no backlash problem. Nevertheless, any additional moving parts involve some increased maintenance problems and so when spectral data is not needed, the simpler modification of FIGS. 1 to 3 presents advantages.

The ballistic cameras of the present invention do not differ from standard cameras as far as the capability of their recording surface is concerned. Ordinarily this means that the energy which is recorded must be in the visible, ultraviolet or very near infrared to which photographic emulsions can be made sensitive. It is, however, possible to provide a surface with a mosaic of infrared detectors or a converter tube which can be used beyond the range of infrared sensitive film. Mosaics for infrared cameras are of course well-known and can be used without significant change in a ballistic camera employing the present invention. The sensitivity of mosaics of infrared detectors is considerably less than the visible so much longer exposures may be necessary. Converter tubes have greater sensitivities more comparable to photographic emulsions and within their response range constitute a useful modification. Ordinarily the greater sensitivity and compactness of photographic emulsions make them the preferred recording surface. However, in unusual cases, for example where a re-entering nose cone must be recorded against a bright daylight sky, the use of infrared detectors with suitable sky filters is worthwhile. The particular recording surface does not form any part of the present invention and the above description of surfaces other than films or plates is only for the purpose of further illustrating the flexibility and versatility of the present invention. To sum up, it may be considered that the present invention is useful with cameras using any kind of optical radiations; that is to say, radiations of wave length sufficiently short to obey optical laws.

In the claims the term "solenoid" is used in its general sense to cover an electromagnetic intermittent actuating means to produce a movement over a limited path. The term is not used in the restricted sense as limited to a solenoid in which the armature moves only in a straight line.

I claim:

1. In a ballistic camera having a radiant energy responsive surface and wide angle imaging optics, the improvement which comprises
    (a) an iris type shutter centered on the optic axis,
    (b) electrically actuated means for periodically and substantially instantly opening the shutter to a wide open position against the resistance of rapid shutter closing means including a solenoid and a linkage from the solenoid to the shutter,
    (c) a stop on said linkage, releasable latching means for said stop to hold the shutter partly open,
    (d) a solenoid for releasing the latch, and
    (e) means for adjusting the position of said releasable latching means to stop the closing of the shutter at a predetermined aperture.

2. A ballistic camera according to claim 1, provided with overlapping obscurating means in series with the shutter and means for moving the obscurating means continuously through a range from substantially full obscuration to full opening of substantially the same size as the full opening of the shutter.

3. A ballistic camera according to claim 2 in which the obscurating means comprise a series of rotating overlapping blades, each blade being provided with a shaft and a pinion and a movable gear engaging said pinions whereby movement of the gear causes each pinion to rotate and to move the overlapping blades through a range from fully closed to wide open.

4. A ballistic camera according to claim 2 comprising an additional obscurating means driven in synchronism with the continuous obscurating means at a rate to produce periodic, very short periods of obscuration.

5. A ballistic camera according to claim 4 in which the additional obscurating means is driven to close the shutter opening at a time when the continuously moving obscurating means are substantially wide open.

References Cited in the file of this patent
UNITED STATES PATENTS

| | | |
|---|---|---|
| 2,420,339 | Rabinow | May 13, 1947 |
| 2,577,774 | Lee | Dec. 11, 1951 |
| 2,861,506 | Leder | Nov. 25, 1958 |
| 2,907,257 | Schiks | Oct. 6, 1959 |